Figure 1:
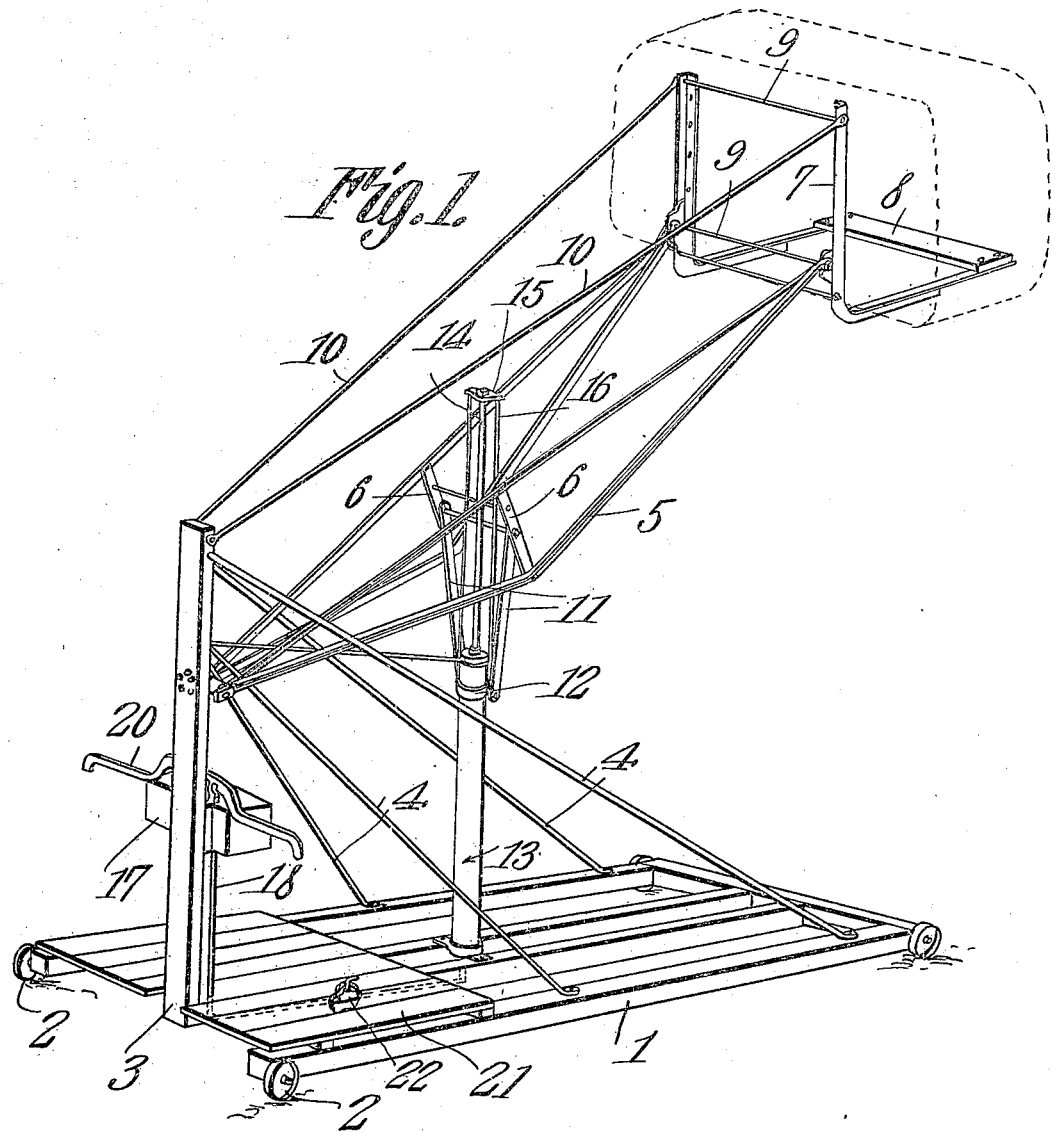

M. A. GILLELAND.
MACHINE FOR STACKING COTTON.
APPLICATION FILED JUNE 2, 1909.

952,108.

Patented Mar. 15, 1910.
2 SHEETS—SHEET 1.

Witnesses

Inventor
Marion A. Gilleland.
By C. A. Snow & Co.
Attorneys

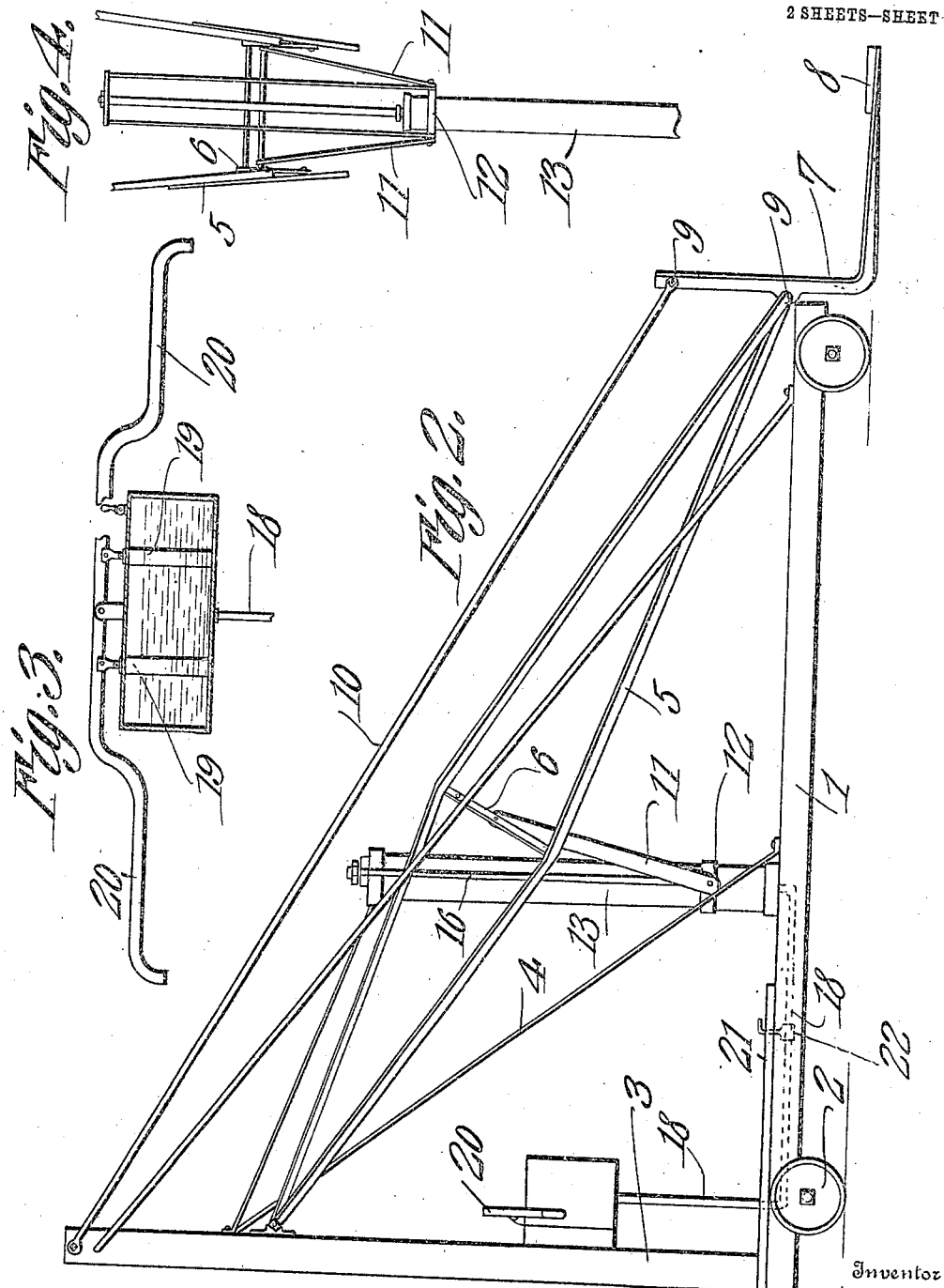

UNITED STATES PATENT OFFICE.

MARION A. GILLELAND, OF STONEWALL, MISSISSIPPI.

MACHINE FOR STACKING COTTON.

952,108.   Specification of Letters Patent.   Patented Mar. 15, 1910.

Application filed June 2, 1909. Serial No. 499,745.

*To all whom it may concern:*

Be it known that I, MARION A. GILLELAND, a citizen of the United States, residing at Stonewall, in the county of Clark and State of Mississippi, have invented a new and useful Machine for Stacking Cotton, of which the following is a specification.

This invention is an apparatus for stacking bales of cotton in a ware house or store yard, and the object of the invention is to provide an apparatus of simple and strong construction which may be easily and rapidly operated and by which the labor of stacking bales of cotton will be very materially reduced.

With this object in view the invention consists in providing a wheeled truck upon which is mounted a hydraulic operating mechanism and a swinging lifting frame connected with said operating mechanism in such a manner as to be readily raised and lowered so as to engage under a bale of cotton and lift the same to a height from which it may be deposited upon the previously stacked bales.

The invention further consists in such novel features of construction and combination and arrangement of parts as will be hereinafter first fully described, and then particularly set forth in the appended claims.

In the annexed drawings, which fully illustrate the invention, Figure 1 is a perspective view of the apparatus, showing it in the position it assumes when holding a bale in an elevated position. Fig. 2 is a side view of the same showing the lifting platform or basket in its lowered position in which it may engage under a bale so as to raise the same upon the proper manipulation of the operating parts. Fig. 3 is a detail view of a part of the operating mechanism. Fig. 4 is a detail elevation of a portion of the plunger rod and its connections.

In carrying out my invention, I employ a truck 1 which is mounted in suitable rollers or wheels 2 in order that it may be moved from point to point in the ware house or store yard or other place where it is desired to stack the cotton, and the wheels may be of any desired construction and mounted on the truck in any preferred manner.

At one end of the truck, I erect a standard 3 which is maintained rigidly in an upright position by means of braces 4 extending from the truck to the said standard, as clearly shown in Figs. 1 and 2. Pivotally mounted at a suitable point of this standard are lifting arms 5 which, in the construction shown, are in the form of trusses, having their central portions braced by connecting bars 6 and their outer ends pivotally attached to a basket or bale support 7. This bale support 7 consists of two L-shaped arms having the free ends of their horizontal branches connected by a platform 8 and their vertical branches connected by cross rods 9, as shown most clearly in Fig. 1, the lower cross rod 9 constituting the pivot for the free ends of the lifting arms 5. The upper cross rod 9 constitutes a pivot for stay rods 10, which extend from the said rod 9 to the upper end of the standard 3 and are pivotally attached thereto. The stay rods 10 being attached to the standard 3 at a point above the point of attachment of the lifting arms will move in a different circle during the raising and lowering of the bale support 7 so that the said support will be at all times maintained in such a position as to prevent dropping of the bale.

Pivotally attached at their upper ends to the bars 6 are a pair of pitmen 11, the lower ends of which are pivotally attached to a collar 12 mounted to slide upon a cylinder 13, erected at the center or other proper point of the truck 1, as clearly shown. Within the cylinder 13 is mounted a plunger, the rod 14 of which extends through the upper end of the cylinder and carries a cross head 15, the opposite ends of which are connected by links 16 to the collar 12.

A tank 17 is supported on the standard 3, and communicates through a pipe 18 with the lower end of the cylinder 13 so that the water or other liquid within the tank may be forced through the pipe 18, and will rise in the cylinder 13 and thereby raise the plunger so that the collar 12 and the parts attached thereto will be lifted.

Any suitable means for controlling the movement of the driving fluid may be employed and in the form illustrated I use a double acting pump, the cylinders 19 of which are submerged in the tank and the pistons of which are manipulated by levers or handles 20 in the usual manner.

A platform 21 is provided on the truck for the workmen, and a vent valve 22 is provided in the pipe 18 so that upon operating the said valve the fluid will return to its former level in the tank and permit the plunger to descend so that the elevated bale may be lowered as will be understood.

From the foregoing description, taken in connection with the acompanying drawings, it is thought that the operation and advantages of this invention will be readily understood and appreciated. The truck is moved to a point adjacent the delivered bales with the bale support 7 in its lowered position, as shown in Fig. 2. The bale may be then worked on to the bale support by means of the usual hooks or the truck forced forward so as to cause the bale support to engage under the bale, as may be more convenient, after which the levers 20 are manipulated so as to drive the pumps and thereby force the liquid from the tank 17 into the cylinder 13 and consequently elevate the plunger. The upward movement of the plunger will be transmitted directly to the cross head 15 and from the said cross head through the links 16 to the collar 12, so that the said collar will ride upward on the cylinder and directly lift the pitmen 11. The lifting action of the pitmen 11 will be transmitted directly to the braces 6 and the lifting arms 5 so that the outer end of said arms will swing upward and consequently the bale will be elevated. The truck may then be moved to the point where the bales are to be stacked and the bale delivered in the desired position.

The device is of a simple construction, possesses great strength and efficiency, and permits the bales to be rapidly stacked with little labor so that the work is expeditiously performed.

Having thus described my invention, what I claim is:—

1. An apparatus for the purpose set forth comprising a wheeled truck, a standard at one end thereof, a vertically movable plunger mounted on the truck intermediate the ends thereof, means for operating said plunger, a bale support, lifting arms pivoted at one end to the standard and at the other to the bale support, connections between said lifting arms and the plunger, and stay rods pivoted at their opposite ends to the standard and the bale support, respectively, at points above the pivots of the lifting arms.

2. The combination of a wheeled truck, a standard thereon, lifting arms fulcrumed on the standard and extending therefrom over the truck, a bale support pivotally mounted on the free ends of the lifting arms, stay rods pivotally attached to the standard and to the bale support above the lifting arms, a cylinder on the truck between the standard and the bale support, a collar slidably mounted on said cylinder, pitmen connecting said collar with the lifting arms at intermediate points of the lengths of the same, a plunger within the cylinder, means for operating the said plunger, a cross head at the upper end of the plunger, and links connecting said cross head with the slidable collar.

In testimony that I claim the foregoing as my own, I have hereto affixed my signature in the presence of two witnesses.

MARION A. GILLELAND.

Witnesses:
T. J. HARPER,
R. C. GILMORE.